(12) United States Patent
Mueller-Marc et al.

(10) Patent No.: US 9,256,063 B2
(45) Date of Patent: Feb. 9, 2016

(54) FLUIDIC, IN PARTICULAR ELECTRO-FLUIDIC, DISPLAY ELEMENT WITH RESERVOIR CHANNELS

(71) Applicant: advanced display technology AG, Appenzell (CH)

(72) Inventors: Oliver Mueller-Marc, Appenzell (CH); Andriy Bitman, Dortmund (DE); Markus Rawert, Coesfeld (DE); Dieter Jerosch, Bad Soden (DE)

(73) Assignee: advanced display technology AG, Appenzell (CH)

( * ) Notice: Subject to any disclaimer, the term of this patent is extended or adjusted under 35 U.S.C. 154(b) by 139 days.

(21) Appl. No.: 14/132,265

(22) Filed: Dec. 18, 2013

(65) Prior Publication Data

US 2015/0168711 A1     Jun. 18, 2015

(51) Int. Cl.
| | |
|---|---|
| *G02B 26/00* | (2006.01) |
| *G09G 3/16* | (2006.01) |
| *G09G 3/34* | (2006.01) |
| *G02F 1/167* | (2006.01) |
| *G02F 1/00* | (2006.01) |
| *G02F 1/01* | (2006.01) |
| *G02B 27/01* | (2006.01) |
| *G02F 1/17* | (2006.01) |

(52) U.S. Cl.
CPC .......... *G02B 26/005* (2013.01); *G02B 27/0172* (2013.01); *G02F 1/0018* (2013.01); *G02F 1/0121* (2013.01); *G02F 1/0128* (2013.01); *G02F 1/0131* (2013.01); *G02F 1/167* (2013.01); *G02F 1/172* (2013.01); *G02F 2001/1676* (2013.01); *G02F 2001/1678* (2013.01); *G09G 3/344* (2013.01); *G09G 3/3433* (2013.01)

(58) Field of Classification Search
CPC ............ G02F 1/167; G02F 2001/1678; G02F 2001/1676; G02F 1/0131; G02F 1/0018; G02F 1/0121; G02F 1/0128; G02F 1/172; G02B 1/092; G02B 26/005; G02B 27/0172; G09G 3/344; G09G 3/3433
USPC ........ 359/290–292, 295, 296; 345/48, 84, 85, 345/107, 108
See application file for complete search history.

(56) References Cited

U.S. PATENT DOCUMENTS

| | | | |
|---|---|---|---|
| 4,583,824 | A | 4/1986 | Lea |
| 8,111,465 | B2 | 2/2012 | Heikenfeld et al. |
| 8,564,873 | B2 | 10/2013 | Mueller-Marc |
| 2003/0020685 | A1 | 1/2003 | Richley |
| 2010/0208328 | A1 * | 8/2010 | Heikenfeld et al. .......... 359/290 |
| 2013/0077152 | A1 | 3/2013 | Mueller-Marc |

FOREIGN PATENT DOCUMENTS

| | | |
|---|---|---|
| WO | 2009036272 A1 | 3/2009 |
| WO | 2011120494 A1 | 10/2011 |

* cited by examiner

*Primary Examiner* — Evelyn A Lester
(74) *Attorney, Agent, or Firm* — Marshall & Melhorn, LLC

(57) ABSTRACT

The invention relates to a fluidic, in particular an electrofluidic display element, comprising at least one pixel chamber (1) which is in fluid communication with at least one reservoir volume (2), wherein an electrically conducting and/or polar liquid (3) can be reciprocated between the pixel chamber (1) and the reservoir volume (2), wherein the pixel chamber (1) has a height (H) and a pixel width (B) and the reservoir volume (2) has a reservoir width (D) and a length (L), characterized in that the width (D) of the reservoir volume (2) is insignificantly greater than or equal to the height (H) of the pixel chamber (1).

15 Claims, 5 Drawing Sheets

FLUIDIC, IN PARTICULAR ELECTRO-FLUIDIC, DISPLAY ELEMENT WITH RESERVOIR CHANNELS

Figure 1:
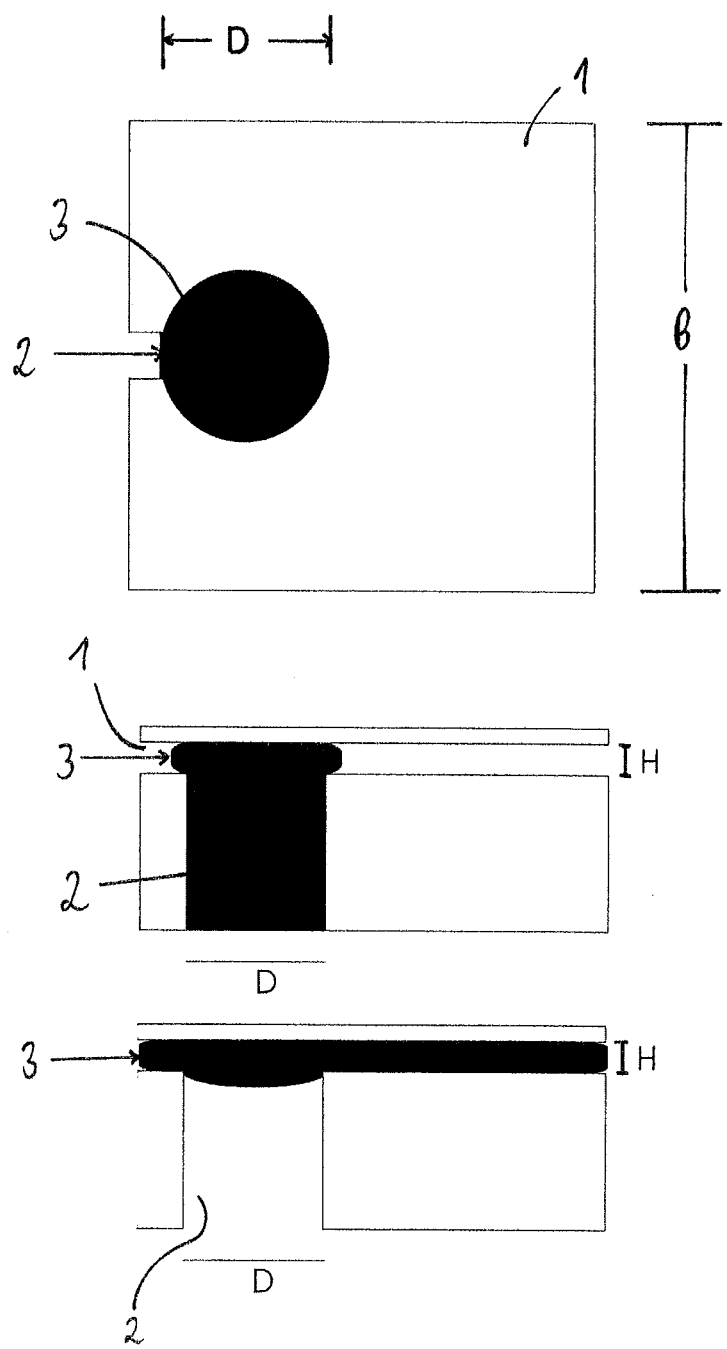

The inventions relates to a fluidic, in particular an electrofluidic display element, comprising at least one pixel chamber which is in fluid communication with at least one reservoir volume, wherein an electrically conducting and/or polar liquid can be reciprocated between the pixel chamber and the reservoir volume, and wherein the pixel chamber has a height and a pixel chamber width and the reservoir volume has at least a reservoir width and a length. The width of the reservoir volume can be constant, but may also vary across the length. Alternately, the reservoir volume tapers conically across the length.

Display elements are known from the prior art which comprise reservoir volumes with most different geometries and wherein the reservoir volumes are most differently arranged with respect to the pixel chamber. For example, display elements having one or more reservoir volumes in the visible region of the display element are known, or display elements having one or more reservoir volumes in an additional level, which is for example below the level of the pixel chamber. When choosing the reservoir volume geometry in the level of the pixel chamber, one will always attempt to keep the required area as small as possible for optical reasons. In most cases, the reservoir volume is formed by a cylindrical pot which merges, via its open side, into the pixel chamber.

Display elements of the generic type are known from WO 2009/036272 A1 and from WO 2011/120494 A1. In those known display elements, the reservoir volume is arranged in the pixel level and thus is permanently visible by a viewer. The reservoir volume is dimensioned such that the electrically conducting and/or polar liquid comprises a volume corresponding both to the reservoir volume and the volume of the pixel chamber. The liquid volume can, for example with the aid of the electrowetting effect, be reciprocated between the pixel chamber and the reservoir volume, wherein the pixel chamber can be penetrated with an electric field by means of a drive electrode selectively applicable with an electric voltage.

In known display elements the width of the reservoir volume (for example, the diameter of a cylinder pot-shaped reservoir) is much greater than the height of the pixel chamber in order to ensure that the liquid is kept within the reservoir volume due to the Young Laplace pressure in an off power state of the control electrode, which pressure is, due the previously mentioned limiting conditions within the reservoir volume substantially lower than in the pixel chamber. The ratio between the width of the reservoir volume and the height of the pixel chamber is exactly a measure for the energy which is needed to move the liquid provided within the reservoir volume in an off power state of the control electrode into the pixel chamber against the Young Laplace pressure. The greater the radius of the reservoir volume, the more energy is required which is necessary for the movement and must be provided via the driving electrode.

It is the object to the invention to further develop a display element of the generic type so that, on the one hand, safe retention of the electrically conducting and/or polar liquid within the reservoir volume is possible, when a driving electrode of the display element is in an off power state and, on the other hand, the energy to be supplied for the movement of the liquid out of the reservoir volume into the pixel chamber is as low as possible.

This object is solved according to the invention by a display element having the features of claim 1 or those of claim 10.

Dependent claims 2 to 9 relate to respective preferred embodiments of the invention.

The display element according to the invention is characterized in that the at least one width of the reservoir volume is insignificantly greater than or equal to the height of the pixel chamber. Preferably, the length of the reservoir volume is greater than or equal to the width of the pixel chamber. In a pixel chamber or reservoir volume, respectively, dimensioned in this way, the liquid always comprises approximately the same energy, independent of whether it is in the reservoir volume or in the pixel chamber. Consequently, the energy, which is needed to move the liquid from the reservoir volume into the pixel volume is reduced to a minimum, and finally, the switching period is considerably short. The same effect may also be achieved when in a reservoir volume which comprises a certain minimum height the length of the reservoir volume is insignificantly shorter than the pixel length.

In the present application, when it is said that the width of the reservoir volume is "insignificantly greater" than the height of the pixel chamber, it is meant that the at least one width of the reservoir volume is not more than 50%, preferably not more than 25% and in particular preferred not more than 10% greater than the height of the pixel chamber.

In an embodiment of the invention, the at least one reservoir volume is channeled, wherein the length of the reservoir volume is at least five times, preferably at least ten times and most preferred at least twenty times of the at least one width of the reservoir volume. According to the invention, the length of the reservoir volume should extend parallel to the pixel level, so that the respective reservoir volume merges into the pixel chamber along one of its longitudinal sides.

In another embodiment, the display element comprises at least two juxtaposed pixel chambers, wherein at least one reservoir volume which is in fluid communication with at least one of said pixel chambers is designed as a separation channel between the juxtaposed pixel chambers, so that the juxtaposed pixel chambers are spaced apart from another by at least and preferably exactly the width of the reservoir volume.

For a most simple greyscale image it is provided in an embodiment of the invention that at least one pixel chamber is in fluid communication with at least two reservoir volumes of different reservoir widths which are fluidically separated or in fluid communication. Preferably, the reservoir volumes are designed as linear or non-linear channels of equal length.

Due to the different widths of the reservoir volume it is achieved, that the respective liquid is on different energy levels within the reservoir volumes, so that different energies are required to move the respective liquid from its respective reservoir volume into the pixel chamber. As a consequence, the liquids may be selectively moved from one or from several reservoir volumes into the pixel chamber by accordingly subjecting the driving electrode with a voltage. The particulars of this embodiment are explained in detail below.

In embodiments of the display element according to the invention, wherein at least one pixel chamber is in fluid communication with at least two fluidically communicating reservoir volumes, the reservoir volumes may be arranged differently with respect to another. In an embodiment of the invention is provided, that the reservoir volumes intersect which each other in a point. For example, two channeled reservoir volumes may be provided which intersect each other substantially right-angled. Alternately, however, at least three reservoir volumes may be provided which intersect each other in a point, wherein respectively two channeled reservoir volumes are perpendicular to another. If the pixel chamber comprises a substantially rectangular, for example squared, basis area, a reservoir volume may for example extend between diagonally opposing corner points of the pixel chamber. Optionally, at least one reservoir volume may extend between opposing side walls of the rectangular pixel chamber and preferably perpendicular thereto. In an embodiment, a plurality of reservoir volumes of equal or different length extends between opposing side walls of a rectangular pixel chamber, wherein the reservoir volumes are parallel spaced from another.

In another embodiment, in turn, at least one pixel chamber is in fluid communication with at least two reservoir volumes which are fluidically separated or in fluid communication with another, wherein the reservoir volumes are arranged to one another in a meandering or in a zigzag pattern.

The display elements according to the invention however, are not limited to those having channeled reservoir volumes. Moreover, an embodiment is provided wherein at least one pixel chamber is in fluid communication with at least two cylindrical fluidically separated reservoir volumes, wherein the at least one reservoir width corresponds to a diameter of the reservoir volumes and wherein the reservoir volumes comprise a different or the same width.

In another embodiment of the invention, at least to fluidically separated pixel chambers are in fluid communication with at least one common reservoir volume. The common reservoir thus forms a central reservoir which may be formed in that reservoir volumes which are associated with several, for example juxtaposed, pixel chambers, are joined to form a common reservoir volume.

The object underlying the invention is further solved by a fluidic, in particular an electrofluidic display element, comprising at least one pixel chamber which is in fluid communication with at least two sets of reservoir volumes, wherein an electrically conducting and/or polar liquid can be reciprocated between each of the reservoir volumes and the pixel chamber, wherein the pixel chamber has a height and the reservoir volumes have a width, characterized in that the reservoir volumes of the first set of reservoir volumes have a first reservoir width and that at least the reservoir volumes of a second set of reservoir volumes have a second reservoir width different from the first reservoir width, wherein the reservoir widths of the reservoir volumes are insignificantly greater than or equal to the height of the pixel chamber.

Figure 2:
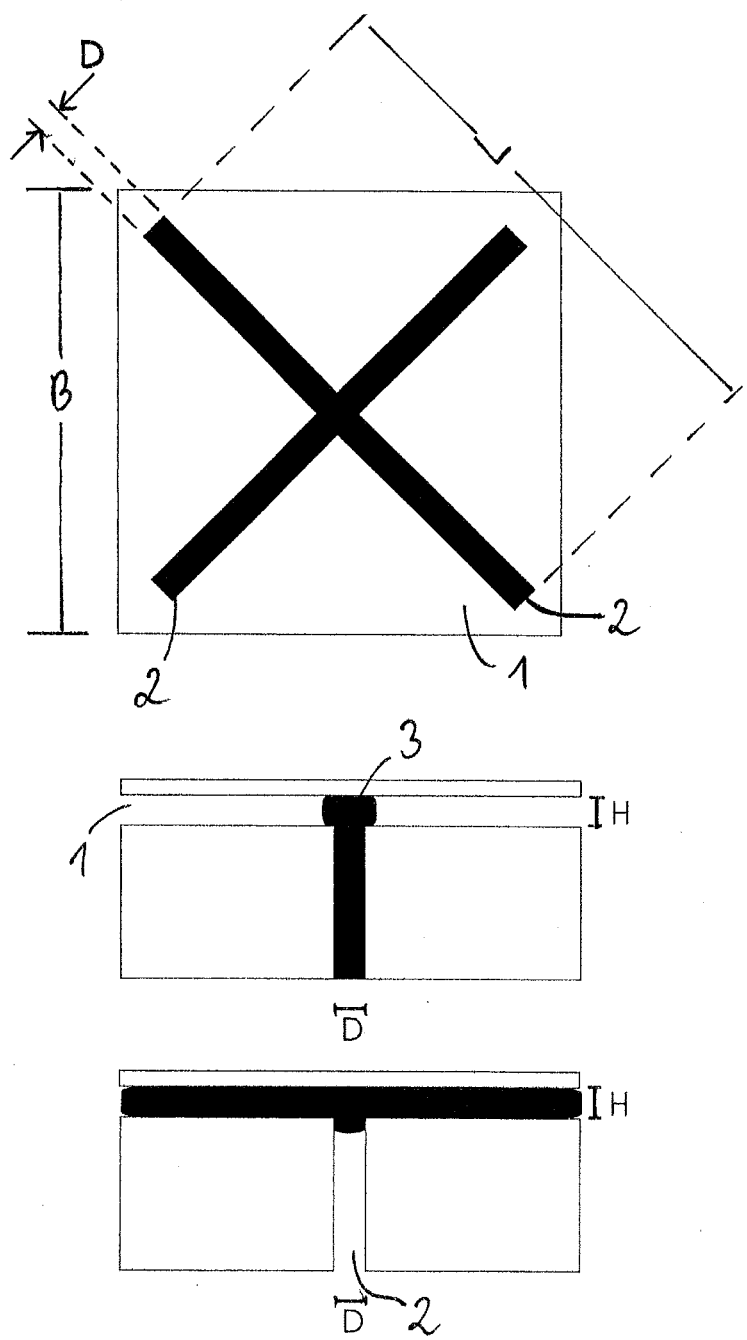
Figure 3:
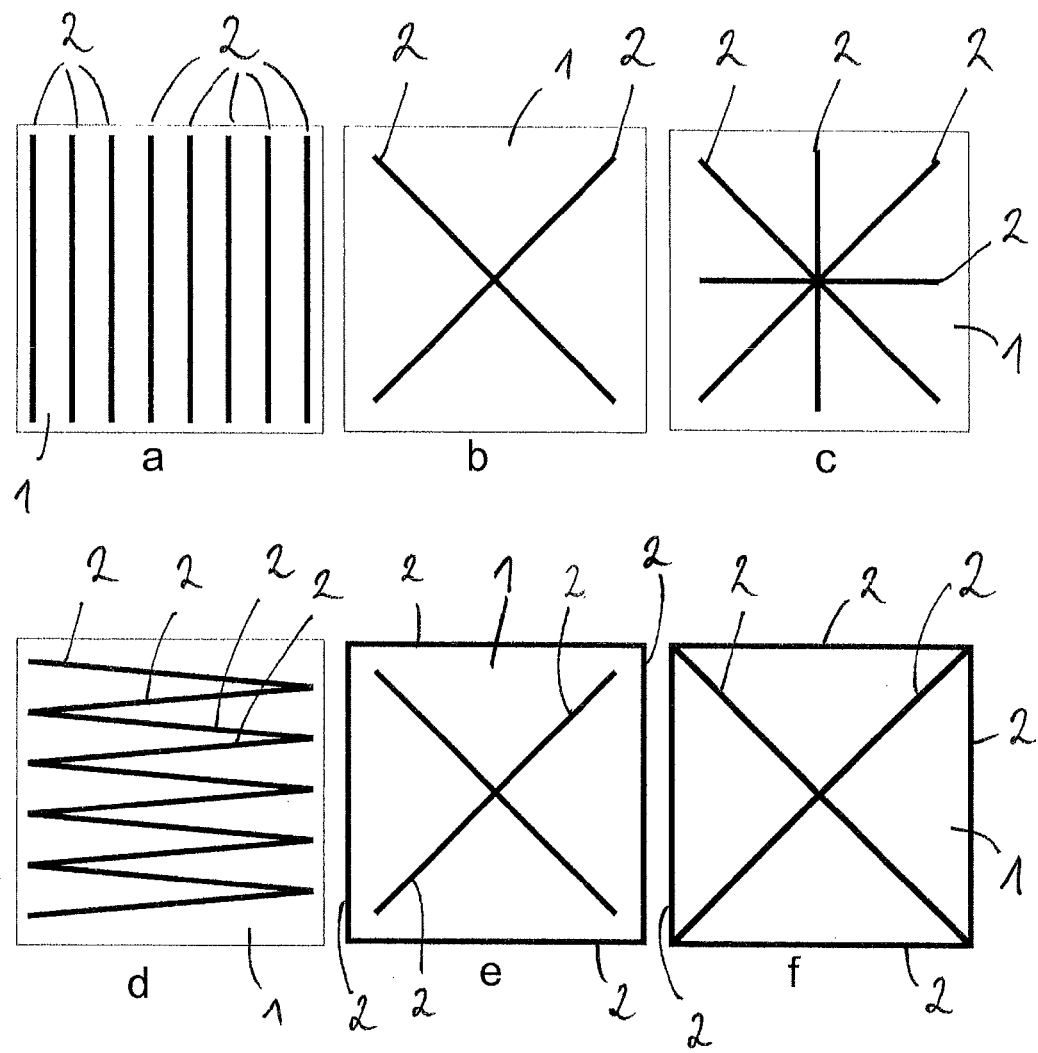
Figure 4:
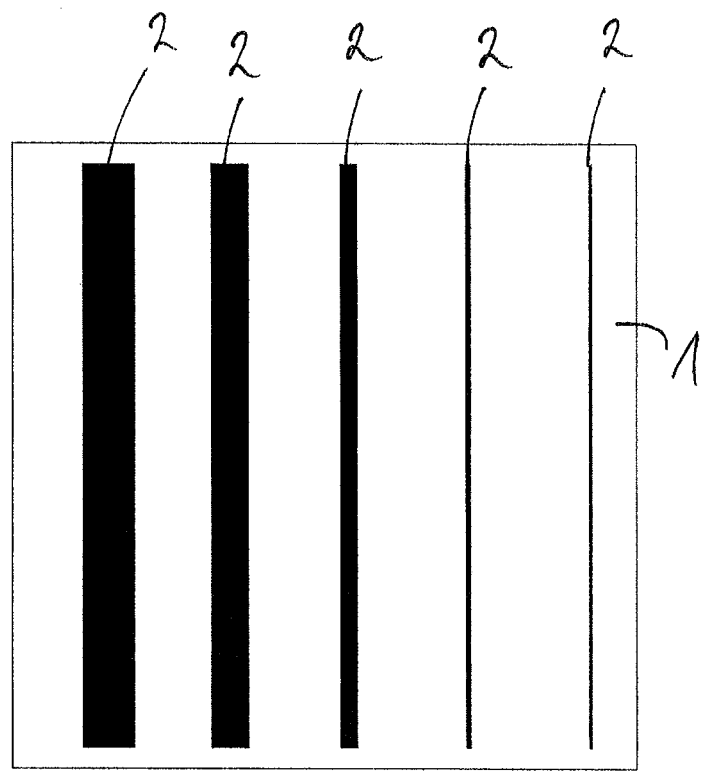
Figure 5:
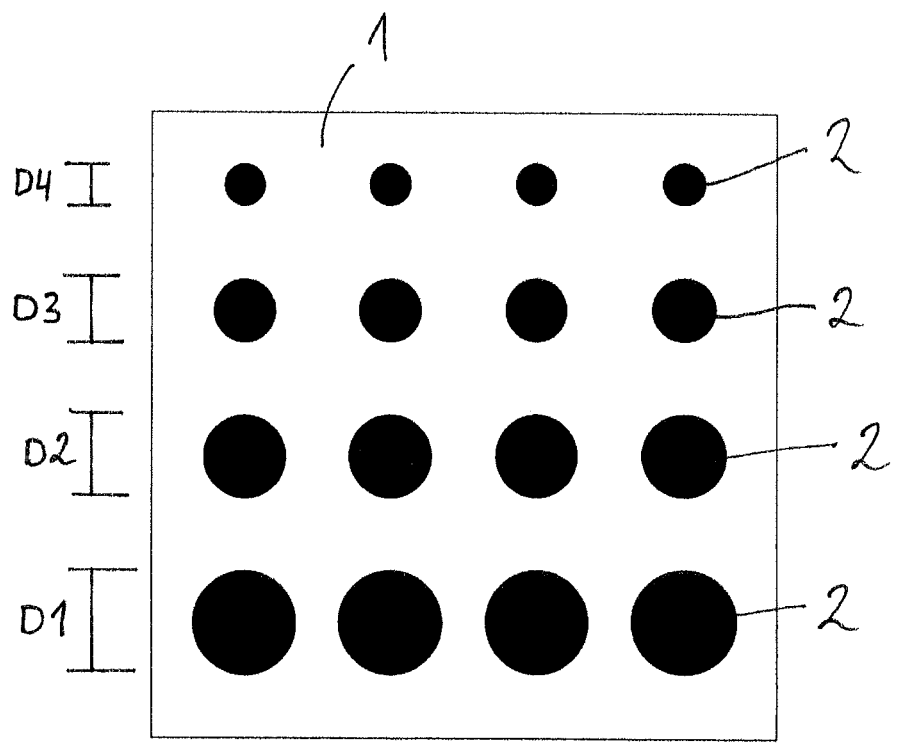

Further details of the invention are explained which the aid of the appended figures. There is shown in:

FIG. 1 a top view and two cross sectional views of a display element according to the prior art;

FIG. 2 a top view and two cross sectional views of a first embodiment of a display element according to the invention;

FIG. 3 top views of six different embodiments of the display element according to the invention having different arrangements of reservoir channels;

FIG. 4 a top view of an embodiment of the display element according to the invention wherein several reservoir channels having different widths are connected to a pixel chamber; and FIG. 5 another embodiment of the display element according to the invention wherein reservoir pots which are circular in cross section of different diameters are in fluid communication with a pixel chamber.

The upper and the middle views of FIG. 1 illustrating the display element according to the prior art show the display element in an off power state which may be recognized in that the electrically conducting and/or polar liquid 3 is within reservoir volume 2, whereas pixel chamber 1 is at least mostly emptied or filled with a transparent, not electrically conducting and/or polar liquid. It may be recognized that the height H of pixel chamber 1 is much smaller than the width D of reservoir volume 2, wherein the reservoir width D exactly corresponds to the diameter of reservoir pot 2 which is circular in cross section. The diameter D of reservoir volume 2 is at least five times the height H of pixel chamber 1. Moreover, the width B of pixel volume 1 is approximately three times as wide as an imaginary length L of reservoir volume 2 which corresponds, due to the circular geometry of the reservoir volume 2, also to the diameter of reservoir volume 2 and accordingly to reservoir width D. The dimensional ratios between reservoir volume and pixel chamber as described above have as a consequence that a considerable Young Laplace pressure must be overcome for conveying liquid 3 from reservoir volume 2 to pixel chamber 1. In the case of an electrofluidic display element, the required energy must be provided by a correspondingly high voltage application of a driving electrode by which pixel chamber 1 is penetrated by an electric field.

The lower cross sectional view of FIG. 1 shows the display element in an on power state, i.e. when the liquid 3 is substantially completely within pixel chamber 1. The overall view of the illustrations of FIG. 1 makes clear that liquid 3 experiences a significant deformation and in particular a great increase of surface for conveyance between reservoir volume 2 and pixel chamber 1 which is an explanation for the comparatively high energy expenditure for conveying liquid 3 from the reservoir volume 2 into to the pixel chamber 1.

FIG. 2 shows an embodiment of the display element according to the invention wherein one pixel chamber 1 is exactly associated with two reservoir volumes 2 which intersect each other in the middle. While pixel volume 1 is essentially squared, reservoir volumes 2 extend between opposed corners of pixel volume 1. If pixel volume 1 were not squared, reservoir volumes could not intersect right-angled to further extend between opposing corners of pixel chamber 1. The arrangement of reservoir volumes 2 as illustrated in FIG. 1 has as a consequence that they may comprise a length L which is greater than the width B of pixel chamber 1. It may further be recognized from the overall view of the illustrations according to FIG. 2 that reservoir volumes 2 are straight and channeled and have a width D corresponding substantially to the height H of pixel chamber 1. The sectional views of FIG. 2 illustrate that liquid 3 experiences only an insignificant deformation or variation of its surface during conveyance between reservoir volume 2 and pixel chamber 1, so that, compared to the display elements known from the prior art, for display elements according to the invention a substantially lower energy must be applied to move the liquid between reservoir volume 2 and pixel chamber 1.

FIG. 3 illustrates possible relative arrangements of reservoir volumes with respect to one another when a pixel chamber 1 is associated with at least two reservoir volumes 2. The reservoir volumes, having substantially identical geometric dimensions, in particular with regard to their widths D and their lengths L, may, according to variant a be parallel spaced apart from one another, and in variant b, two reservoir channels 2 intersect one another right-angled and respectively half-length, wherein reservoir channels 2 respectively extend between opposing corners of pixel chamber 1. In variant c two further reservoir volumes 2 were added to reservoir volumes 2 according to variant b which again extend right-angled with respect to one another and between respectively opposing sides of the pixel chamber. In variant d, reservoir volumes 2 are arranged in a zigzag pattern via ends thereof, wherein each reservoir volume 2 extends between opposing sides of pixel chamber 1, but not right-angled, so that reservoir volumes 2 may comprise a length L corresponding at least to the width B of pixel chamber 1.

Variant e supplements variant b by reservoir volumes 2 which extend along the four outer bordering edges of pixel chamber 1. The ends of diagonally extending reservoir volumes 2 are disposed in a distance to those reservoir volumes 2 bordering pixel chamber 1. In order to achieve still improved filling of pixel chamber 1, the diagonally extending reservoir volumes 2 in variant f are extended into the corner region of pixel chamber 1 and to the bordering reservoir volumes 2.

In order to achieve a greyscale image which is as simple as possible, it is provided in the embodiment of FIG. 4 that a plurality of parallel spaced reservoir volumes 2 is associated with a pixel chamber 1, wherein all reservoir volumes 2 have the same length L, but different widths D. Since the widths D of reservoir volumes differ, different energies are required to convey the liquids from the respective reservoir volume into pixel chamber 1. Consequently, in an electrofluidic display element, by applying a suitable voltage to the driving electrode, it may be predefined from how many reservoir volumes 2 the respective liquid 3 should be conveyed into pixel chamber 1. The narrowest reservoir volume can be emptied using the lowest energy. The entire pixel chamber 1 may, for example, be colored with the liquids 3 of up to five reservoir volumes 2. The width of each reservoir volume 2 defines a respective voltage threshold $U_S$ which must at least be applied to convey the respective liquid 3 from the respective reservoir volume 2 into pixel chamber 1. If a voltage is adjusted which is greater than $U_{S1}$ and smaller than $U_{S2}$ only liquid from the narrowest reservoir volume will exit. For a voltage which is greater than $U_{S3}$ and smaller than $U_{S4}$ liquid from the three narrowest reservoir volumes 2 will exit, where as the liquids from the two reservoir volumes 2 having greater widths D remain within their reservoir volumes 2 due to a Young Laplace pressure which is not completely compensated.

FIG. 5 shows a variant of the display element according to the invention where utilization of a plurality of reservoir volumes 2 having unified, but the smaller width D, into which the liquid 3 is divided, is provided, in order to avoid reservoir volumes 2 having a width D which is substantially greater than the height of pixel chamber 1 (c.p. FIG. 1). Thus, it may also be achieved that a comparatively small energy is required for conveying liquid 3 from reservoir volumes 2 into pixel chamber 1. In analogy to the embodiment of FIG. 4, more reservoir volumes 2 may be provided which are different with respect to their width D in order to achieve at a greyscale image which is as simple as possible. The embodiment according to FIG. 5 comprises four sets of reservoir volumes comprising respectively four similar reservoir volumes. The reservoir volumes of each set have the same width D1, D2, D3, D4, wherein the widths D1, D2, D3, D4 differ from another. All widths D1, D2, D3, D4 are insignificantly greater than or equal to the height H of pixel chamber 1.

The features of the invention disclosed in the above description, in the drawing and in the claims may be both individually and in any combination be material for realizing the invention.

The invention claimed is:

1. A fluidic display element, comprising at least one pixel chamber (1) which is in fluid communication with at least one reservoir volume (2), wherein an electrically conducting and/or polar liquid (3) can be reciprocated between the pixel chamber (1) and the reservoir volume (2), wherein the pixel chamber (1) has a height (H) and a pixel chamber width (B) and the reservoir volume (2) has a reservoir width (D) and a length (L), characterized in that the width (D) of the reservoir volume (2) is insignificantly greater than or equal to the height (H) of the pixel chamber (1), wherein the at least one reservoir volume (2) is channeled, and wherein the length (L) of the reservoir volume (2) is at least five times of the width (D) of the reservoir volume (2).

2. The display element of claim 1, wherein the length (L) of the reservoir volume (2) is greater than or equal to the width (B) of the pixel chamber (1).

3. The display element of claim 1, wherein the length (L) of the reservoir volume (2) is at least ten times of the width (D) of the reservoir volume (2).

4. The display element of claim 1, comprising at least two juxtaposed pixel chambers (1), wherein at least one reservoir volume (2) which is in fluid communication with at least one of said pixel chambers (1) defines a separation channel between the juxtaposed pixel chambers (1), so that the juxtaposed pixel chambers (1) are spaced apart from another by at least the width (D) of the reservoir volume.

5. The display element of claim 1, wherein at least one pixel chamber (1) is in fluid communication with at least two reservoir volumes (2) of different reservoir width (D) which are fluidically separated or in fluid communication.

6. The display element of claim 5, wherein the reservoir volumes (2) define linear or non-linear channels of equal length (L).

7. The display element of claim 1, wherein at least two reservoir volumes (2) intersect with each other in least one point of intersection and are in fluid communication in at least one point of intersection, wherein furthermore the reservoir volumes (2) are in fluid communication with a common pixel chamber (1).

8. The display element of claims 1, wherein at least one pixel chamber (1) is in fluid communication with at least two reservoir volumes (2), wherein the reservoir volumes (2) are spaced apart and extend parallel to one another.

9. The display element of claim 1, wherein at least one pixel chamber (1) is in fluid communication with at least two reservoir volumes (2), wherein the reservoir volumes (2) are arranged to one another in a meandering pattern or in a zigzag pattern.

10. The display element of claim 1, wherein at least one pixel chamber (1) is in fluid communication with at least two cylindrical reservoir volumes (2), wherein the reservoir width (D) corresponds to a diameter of the reservoir volumes (2) and wherein at least two of the reservoir volumes (2) have a different or the same width (D).

11. The display element of claim 1, wherein at least two fluidically separated pixel chambers (1) are in fluid communication with at least one common reservoir volume (2).

12. The display element of claim 1, wherein the length (L) of the reservoir volume (2) is at least twenty times of the width (D) of the reservoir volume (2).

13. The display element of claim 1, wherein the display element is an electrofluidic display element.

14. A fluidic display element, comprising at least one pixel chamber (1) which is in fluid communication with at least a first and a second set of reservoir volumes (2), wherein an electrically conducting and/or polar liquid (3) can be reciprocated between each of the reservoir volumes (2) and the pixel chamber (1), wherein the pixel chamber (1) has a height (H) and the reservoir volumes (2) have a width (D1, D2), characterized in that the reservoir volumes (2) of the first set of reservoir volumes (2) have a first width (D1) and that at least the reservoir volumes of a second set of reservoir volumes have a second reservoir width (D2) different from the first reservoir width, wherein the reservoir widths (D1, D2) of the reservoir volumes (2) are insignificantly greater than or equal to the height (H) of the pixel chamber (1).

15. The display element of claim 14, wherein the display element is an electrofluidic display element.

* * * * *